United States Patent [19]
Tanaka et al.

[11] Patent Number: 5,272,765
[45] Date of Patent: Dec. 21, 1993

[54] SYSTEM FOR PROCESSING CHARACTER IMAGES

[75] Inventors: Hideaki Tanaka, Daito; Yoshihiro Kitamura, Yamatokoriyama; Toshiaki Morita, Nara, all of Japan

[73] Assignee: Sharp Kabushiki Kaisha, Osaka, Japan

[21] Appl. No.: 785,249

[22] Filed: Nov. 4, 1991

Related U.S. Application Data

[63] Continuation of Ser. No. 261,007, Oct. 21, 1988, abandoned.

[30] Foreign Application Priority Data

Oct. 21, 1987 [JP] Japan ................................ 62-267227

[51] Int. Cl.$^5$ .............................................. G06K 9/62
[52] U.S. Cl. .......................................... 382/13; 382/12
[58] Field of Search ...................... 382/58, 59, 65, 13, 382/12, 9

[56] References Cited

U.S. PATENT DOCUMENTS

| | | | |
|---|---|---|---|
| 3,088,097 | 4/1963 | Steinbuch et al. | 382/19 |
| 3,921,136 | 11/1975 | Bar-Lev | 382/61 |
| 3,999,161 | 12/1976 | Van Bilzen et al. | 382/25 |
| 4,028,674 | 6/1977 | Chuang | 382/36 |
| 4,180,799 | 12/1979 | Smith | 382/37 |
| 4,468,809 | 8/1984 | Grabowski et al. | 382/50 |
| 4,731,857 | 3/1988 | Tappert | 382/13 |
| 4,941,189 | 7/1990 | Britt | 382/37 |

Primary Examiner—David K. Moore

[57] ABSTRACT

A system for processing character provides assumed reference lines extending along the direction of a character image string. The distances between the portions of character images and the reference line are compared and the character images are classified into one of character groups in accordance with the distances.

3 Claims, 4 Drawing Sheets

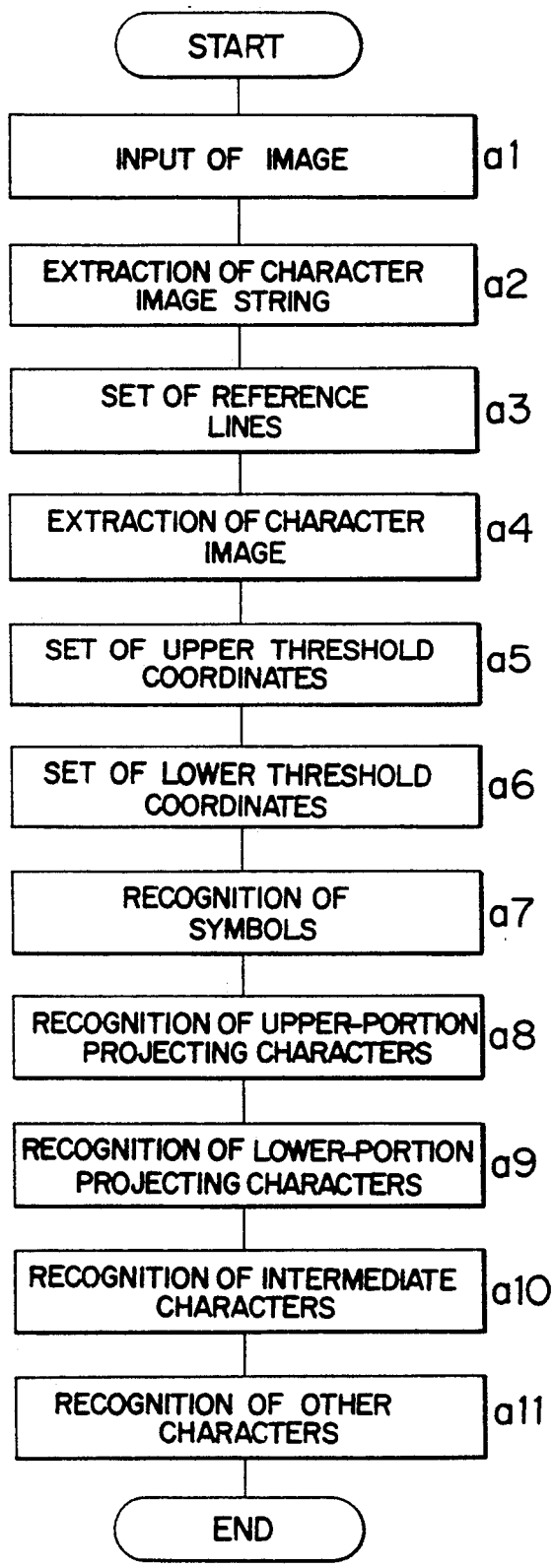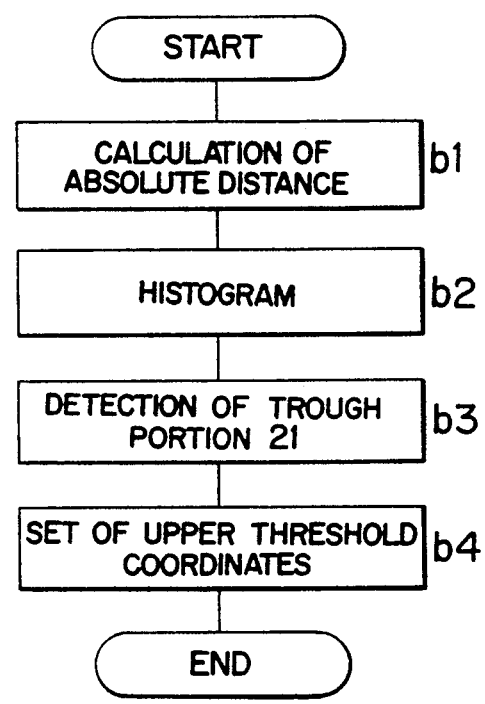

FIG. 6.
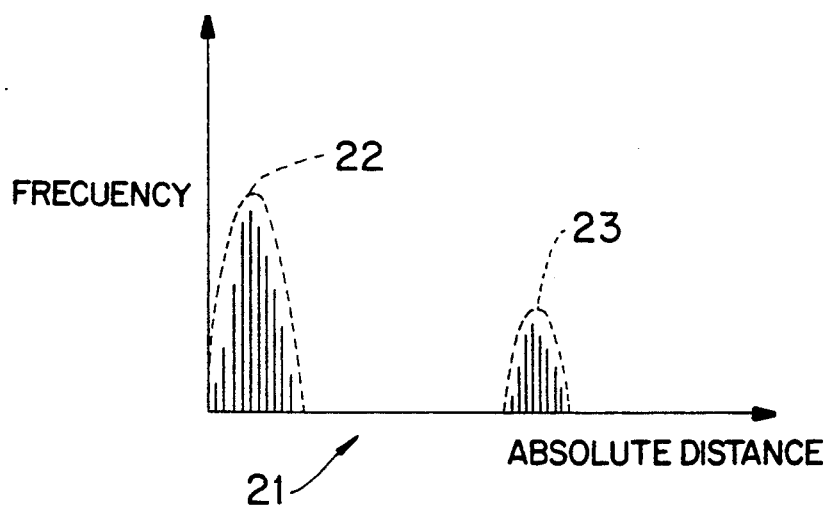
FIG. 7(1)
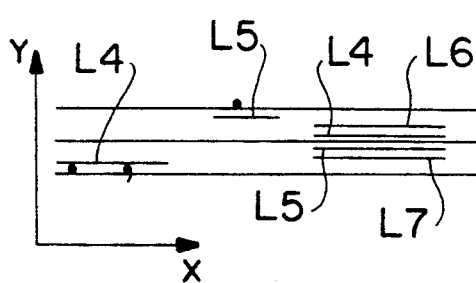
FIG. 7(2)
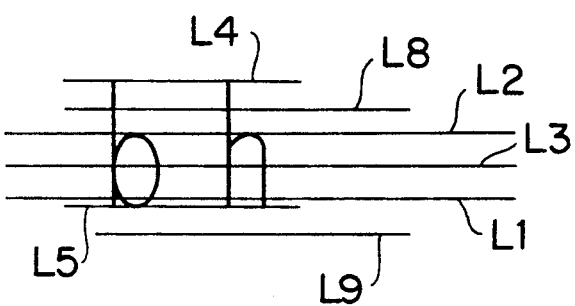
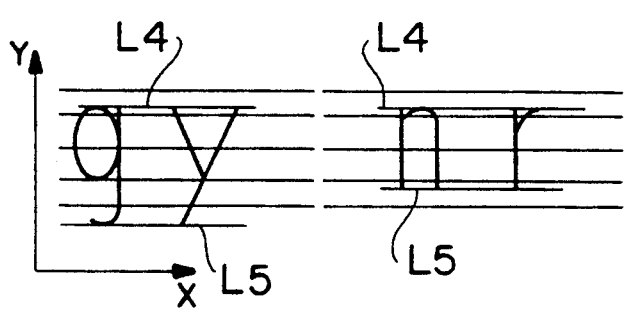
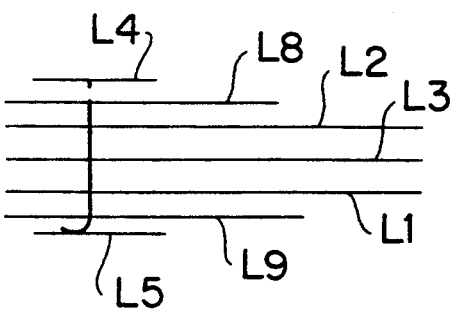
FIG. 7(3)    FIG. 7(4)    FIG. 7(5)

SYSTEM FOR PROCESSING CHARACTER IMAGES

This application is a continuation of application Ser. No. 07/261,007 filed on Oct. 21, 1988 now abandoned.

BACKGROUND OF THE INVENTION

1. Field of the Invention

The present invention relates to a system for processing character images which is useful in an apparatus for example, an OCR (Optical Character Reader).

2. Description of the prior art

As an input means for a computer system, an OCR has been used. In an OCR, a manuscript is irradiated by a light beam. An image sensor reads character images on the manuscript, and the read character images are recognized as characters (including alphanumeric characters, symbols, etc.). The data of the recognized characters is transmitted to a computer system to be further processed.

When recognizing character images as characters in an OCR, character image strings are extracted from the read images, and then an individual character image is extracted from one of the character image strings. This is compared with all of the character patterns stored in a dictionary of the OCR, and then recognized as one character. Since each extracted character image is compared with all character patterns in the dictionary, it takes a long time to recognize a character image as one of the characters, because of the number of the character patterns in the dictionary.

Moreover, the rate of recognition (the ratio of correct recognition) of an OCR having a conventional recognition system is inferior because, for example, in English, there are similar characters (such as "S" and "s", "O" and "o", etc.) and characters of the same shape (such as "," and "·." "·" etc; hereinafter such characters are referred to as same shape characters")

SUMMARY OF THE INVENTION

The system for processing character images of this invention, overcomes the above-discussed and numerous other disadvantages and deficiencies of the prior art. The system comprises a means for setting an assumed reference line extending along the direction of a character image string. A comparing means is provided which compares the positional relation along the direction intersecting said assumed reference line, between one portion of each character image and said reference line. Further there is a classifying means which classifies each character image into one of character groups in accordance with said positional relation.

The system for processing character images comprises a means for setting two or more assumed reference lines extending along the direction of a character image string. A comparing means is provided which compares the positional relations along the direction intersecting said assumed reference lines, between portions of each character image and said reference lines. Further there is a classifying means which classifies each character image into one of character groups in accordance with said positional relations.

In a preferred embodiment, the reference lines include at least a lower reference line and an upper reference line between which the main portion of each character images to be recognized exists.

Thus, the invention described herein makes possible the objectives of:

(1) providing a system for processing character images which can reduce the time for the recognition; and (2) providing a system for processing character images which can improve the rate of recognition even if character images to be recognized include those corresponding to similar and/or same-shape characters.

According to the system of the invention, at least one virtual or assumed reference line extending in the direction of a character image string which has been read by a suitable reading means is set in the character string. The positional relation between the reference lines and one or more portions of a character image to be recognized (for example, the distance between the reference line and the portion of the character image which is most remote from one of the reference lines) is obtained. Based on the obtained positional relation(s), the character image to be recognized is classified into one of the pattern groups (hereinafter, such a group is referred to as "selected pattern group"), which will be compared with the character patterns in the dictionary which belong to the selected pattern group. Hence, the number of the character patterns to be compared with the character image can be greatly reduced thereby shortened the time for recognition. Furthermore, characters constituting the similar characters or same-shape characters are classified into different groups, accordingly the rate of recognition can be improved.

BRIEF DESCRIPTION OF THE DRAWINGS

This invention may be better understood and its numerous objects and advantages will become apparent to those skilled in the art by reference to the accompanying drawings as follows:

FIG. 4 is a flow chart of the operation of the OCR in of FIG. 1.

FIG. 5 is a flow chart of the detection of the upper threshold coordinates.

FIG. 6 is a histogram obtained as a result of the detection of the upper and lower extracting coordinates.

FIG. 7 is a diagram illustrating relative positional relations of character images.

DESCRIPTION OF THE PREFERRED EMBODIMENTS

Figure 2:
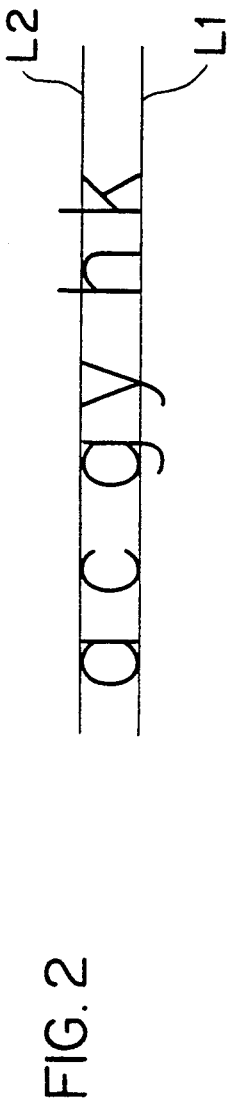
FIG. 2 is a diagram illustrating the reference lines.

FIG. 2 is a diagram for illustrating the reference lines. Character images which have been read by an image sensor are arranged in rows. Hereinafter, a character image is shown in the form of the corresponding character in brackets. In the character image string [a c g y h k] arranged in a row, two assumed lines L1 and L2 are set along the row so that the main portion of the character images is aligned on the lower assumed line L1 and substantially sandwiched between the two assumed lines L1 and L2.

One portion of the character images [g] and [y] projects below the lower assumed line L1, and one portion of the character images [h] and [k] projects above the upper assumed line L2. In other words, the main portions of the character images are substantially sandwiched between the two assumed lines L1 and L2. Hereinafter, the assumed lines L1 and L2 are referred "lower reference line L1" and "upper reference line L2", respectively.

Figure 3:
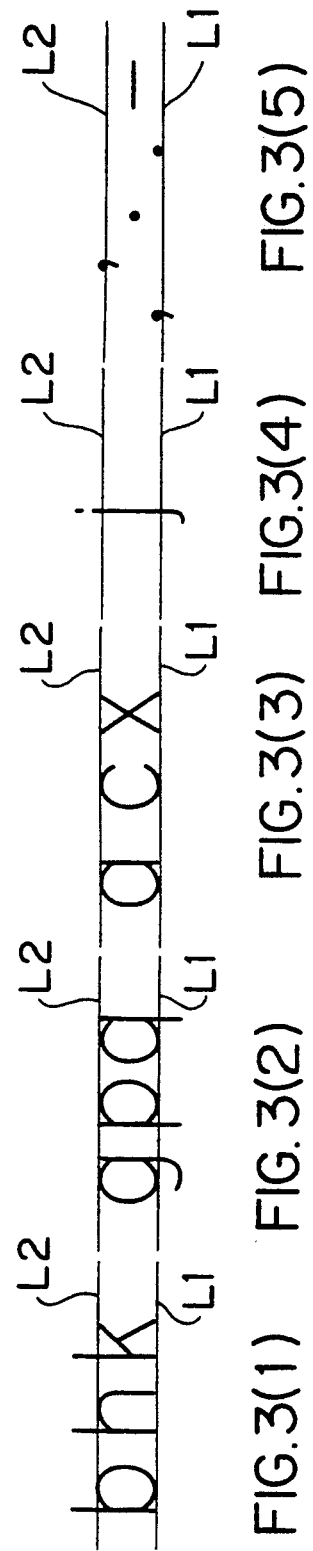
FIG. 3 shows examples of character image groups.

Specific examples of character image groups classified in such a way are shown in FIG. 3. The character images [b h k] in FIG. 3(1) have a portion projecting above the upper reference line L2 ("upper-portion projecting characters"). The character images [g p q] shown in FIG. 3(2) have a portion projecting below the lower reference line L1 ("lower-portion projecting characters"). The character images [a c x] shown in FIG. 3(3) exist between the lower and upper reference lines L1 and L2 ("intermediate characters"). The character image [j] shown in FIG. 3(4) has a portion projecting below the lower reference line L1, and another portion projecting above the upper reference line L2 ("both-portion projecting character"). FIG. 3(5) shows symbols [, ·· ·].

Figure 1:
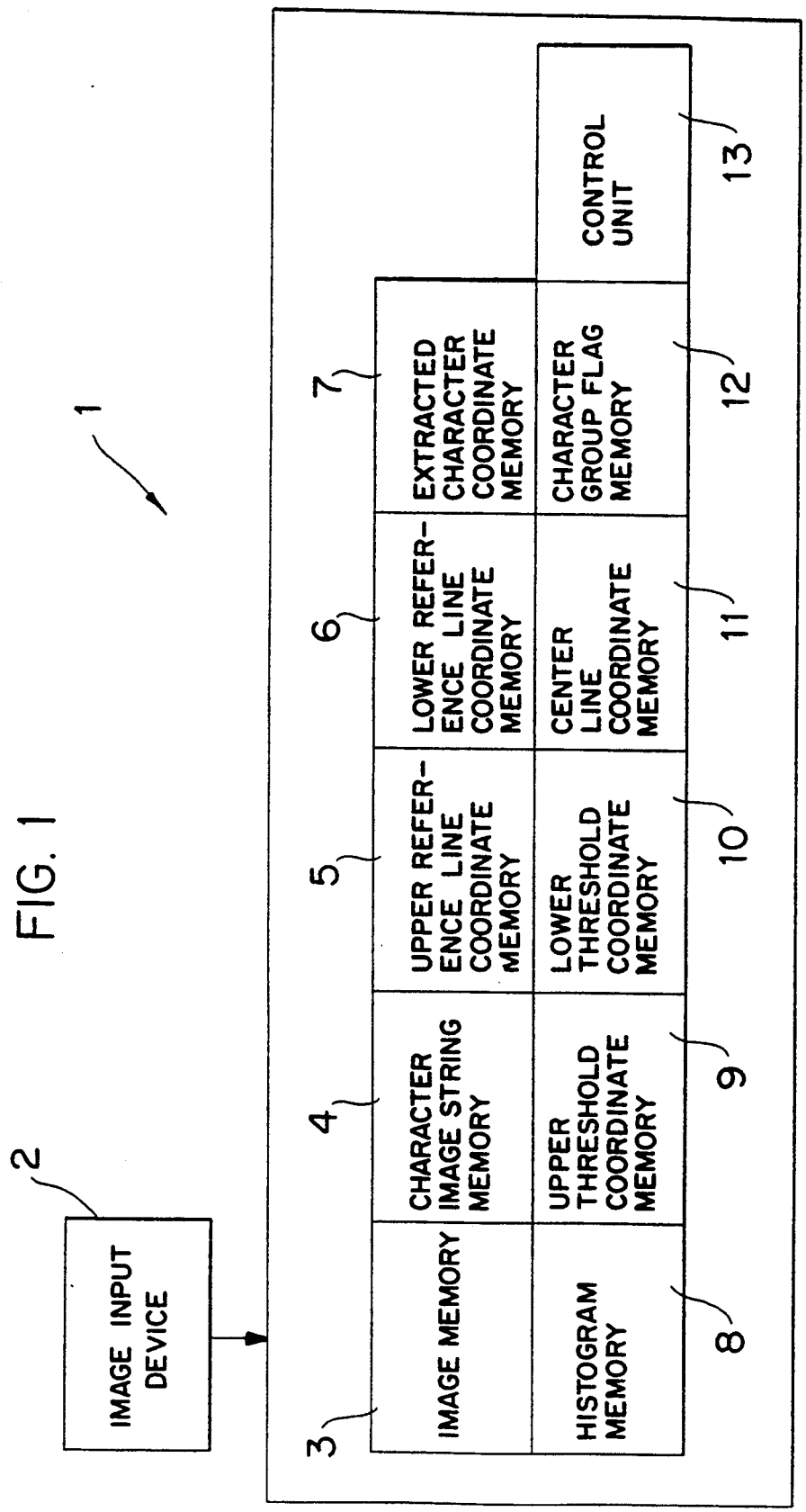
FIG. 1 is a block diagram illustrating diagrammatically an OCR having the system according to the invention.

FIG. 1 is a block diagram illustrating diagrammatically an OCR having the system according to the invention. The OCR 1 comprises: an image input device 2 having a solid state image sensor or the like; an image memory 3 for storing image data which has been read by the image input device 2; a character image string memory 4 in which the character images of an extracted character image string are stored; an upper reference line coordinates memory 5 and a lower reference line coordinate memory 6 for storing the coordinates of the reference lines L2 and L1 which are extracted for each character image string; and an extracted character coordinate memory 7 in which the coordinates extracted from the extracted character image are stored.

The OCR 1 also comprises: a histogram memory 8 for storing a histogram which is obtained from the absolute distance between the extracted character coordinates and the upper reference line L2 or lower reference line L1, an upper threshold coordinate memory 9 and lower threshold coordinate memory 10 in which upper and lower threshold coordinates obtained from the histogram are stored; a center line coordinate memory 11 for storing the coordinates of the center line obtained from the coordinates of the reference lines L1 and L2; a character group flag memory 12 for storing character image group flags for the classified character image group; and a control unit 13 for controlling the aforementioned units of the OCR 1.

The fundamental operation of the OCR 1 will be described, referring to FIG. 4 which is a flow chart of the OCR 1.

The image memory 3 stores the character image data which has been read by the image input device 2 (step a1). The image data of a character image string is extracted from the character image data stored in the image memory 3, and is stored in the character image string memory 4 (step a2).

In step a3, the upper and lower reference lines L2 and L1 are extracted from the image data of the character image string, and virtual coordinate axis are set in the character image string memory 4, to obtain the coordinates of the upper and lower reference lines which coordinates are stored in the upper reference line coordinate memory 5 and the lower reference line coordinate memory 6, respectively. In step a4, a character image is extracted from the image data of the character image string, and the coordinates of the extracted character image on the virtual coordinate axis are stored in the extracted character coordinate memory 7. Hereinafter, the coordinates of the uppermost portion of the extracted character image is referred to as "upper extracted coordinates", and the coordinates of the lowermost portion is referred to as "lower extracted coordinates".

In step a5, the upper threshold coordinates of the extracted character image are detected. A way of the detection of the upper threshold coordinates will be described, referring to FIGS. 5 and 6 which respectively show a flow of the detection and a histogram obtained as a result of the detection of the upper and lower extracting coordinates. An absolute distance between the coordinates of the upper reference line L2 and the upper extracted coordinates of each character image in the character image string is calculated (step b1). From the obtained absolute distances for the character images, a histogram (FIG. 6) is prepared to be stored in the histogram memory 8 (step b2). In the histogram of FIG. 6, there are two crests 22 and 23. The crest 22 corresponds to the lower extracted coordinates of each character images, and the crest 23 corresponds to the upper extracted coordinates of each character images. In step b3, the trough portion 21 between the crests 22 and 23 is detected. From the coordinates of the trough portion 21 and the coordinates of the upper reference line L2, the upper threshold coordinates are obtained, and stored in the upper threshold coordinate memory 9 (step b4).

In step a6 of FIG. 4, the lower threshold coordinates are obtained in the same manner as described above, and stored in the lower threshold coordinate memory 10.

In steps a7 to a11, the classification of the character images of the character image string is conducted. Referring to FIG. 7, the process of steps a7 to a11 will be described. FIG. 7 illustrates relative positional relations between the virtual coordinate axis, character images, reference lines, and extracting lines.

First, the OCR 1 judges the character images whether they are symbols or not (step a7). The center line L3 is set from the upper reference line L2 and the lower reference line L1, and the coordinates of the center line L3 are stored in the center line coordinate memory 11. As shown in FIG. 7(1), if the y-coordinate of the upper extracting line L4 is smaller than that of the center line L3 (i.e., the upper line L4 exists below the center line L3), the character image is recognized as "·" or ",". In this way, y-coordinates of two lines in the virtual coordinate axis are used to judge the positional relation of the two lines in the vertical direction. If the lower extracting line L5 exists above the center line L3, the character image is recognized as "'(apostrophe)" or ""(double quotation mark)". When the character image to be recognized corresponds to "·" or "—", a symbol upper threshold line L6 and a symbol lower threshold line L7 are set so that the threshold value is one fourth of the distance between the upper and lower reference lines L2 and L1. If the upper extracting line L4 exists below the symbol upper threshold line L6 and the lower extracting line L5 exists above the symbol lower threshold line L7, the character image is recognized as "·" or "—". When the character image is recognized as a symbol in this way, the symbol group flag is set in the corresponding portion of the character group flag memory 12.

Then, the OCR 1 judges the character images which have not been recognized as symbols in step a7, whether they are upper-portion projecting characters or not (step a8). As shown in FIG. 7(2), if the upper extracting line L4 is above the upper threshold line L8 and the lower extracting line L5 is above the lower threshold line L9, the character image is recognized as an upper-portion projecting character. The upper-portion projecting character flag is set in the corresponding portion of the character group flag memory 12. The upper and lower threshold lines L8 and L9 are obtained from the coordinates of the upper and lower threshold coordinates stored in the memories 9 and 10, respectively.

In step a9, the character images which have not been recognized as upper-portion projecting characters in step a8 are judged whether they are lower-portion projecting characters or not. As shown in FIG. 7(3), if the upper extracting line L4 is below the upper threshold line L8 and the lower extracting line L5 is below the lower threshold line L9, the character image is recognized as a lower-portion projecting character. The lower-portion projecting character flag is set in the corresponding portion of the character group flag memory 12.

In step a10, the character images which have not been recognized as lower-portion projecting characters in step a9 are judged whether they are intermediate characters or not. As shown in FIG. 7(4), if the upper extracting line L4 is below the upper threshold line L8 and the lower extracting line L5 is above the lower threshold line L9, the character image is recognized as an intermediate character. The intermediate character flag is set in the corresponding portion of the character group flag memory 12.

The remaining character images (such as those shown in FIG. 7(5)) which have not been recognized as intermediate characters in step a10 are judged as other characters (step a11). The other character flag is set in the corresponding portion of the character group flag memory 12.

In this way, a character image extracted from character image string can be classified into one of the five groups: the symbol group; the upper-portion projecting group; the lower-portion projecting group; the intermediate group; and the other group. Moreover, a character image corresponding to a symbol can be not only classified into the symbol group, but also into one of the subdivided groups. Accordingly, the number of character patterns to be compared with a character image is greatly decreased, thereby reducing the time required for the recognition. Character images corresponding to similar characters can be classified into the groups different to each other, and also character images corresponding to same-shape characters can be classified into the groups different to each other. Hence, the rate of recognition can be effectively improved.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A system for processing character images comprising:

means for reading image data;

means for extracting a character image string including individual character images from said read image data;

means for determining virtually a position of a reference line extending along the direction of said character image string, so that each of said individual character images excluding their ascenders is substantially placed below said reference line;

means for extracting each of said individual character images from said character image string and for obtaining an upper position of said individual character image;

means for determining virtually a position of a threshold line parallel to said reference line, based on a distribution of distances between said reference line and each upper position of said individual character images, wherein said distribution includes two portion of crests, and said means for determining virtually a position of a threshold line determines said position of said threshold line based on a trough portion between said two portion of crests; and means for classifying said individual character images into at least two groups, relying upon a relative relationship between said upper position of said individual character image and said position of said threshold line.

2. A system for processing character images comprising:

means for reading image data;

means for extracting a character image string including individual character images from said read image data;

means for determining virtually a position of reference line extending along the direction of said character image string, so that each of said individual character images excluding their descenders is substantially placed above said reference line;

means for extracting each of said individual character images from said character image string and for obtaining an lower position of said individual character image;

means for determining virtually a position of a threshold line parallel to said reference line, based on a distribution of distances between said reference line and each lower position of said individual character images wherein said distribution includes two portion of crests, and said means for determining virtually a position of a threshold line based on a trough portion between said two portion of crests; and means for classifying said individual character images into at least two groups, relying upon a relative relationship between said lower position of said individual character image and said position of said threshold line.

3. A system for processing character images comprising:

means for reading image data;

means for extracting a character image string including individual character images from said read image data;

means for determining virtually a position of an upper reference line and a position of an lower reference line, said lines extending along the direction of said character image string, so that each of said individual character images excluding their ascenders and descenders is substantially placed between said reference lines, and for obtaining a position of a center line between said reference lines;

means for extracting each of said individual character images from said character image string and for obtaining an upper position and an lower position of said individual character image;

means for determining virtually a position of an upper threshold line parallel to said reference line, based on a distribution of distances between said upper reference line and each upper position of said individual character images, and for determining virtually a position of an lower threshold line parallel to said reference line, based on a distribution of distances between said lower reference line and each lower position of said individual character image, wherein said each distribution includes two portion of crests, and said means for determining virtually a position of an upper threshold line and a position of an lower threshold line determines said position of said upper threshold line and said position of said lower threshold line, based on a trough portion between said two portion of crests; and means for classifying said individual character images into at least five groups, relying upon a relative relationship between said upper position of said individual character image, said lower position of said individual character image, said position of said threshold line, said position of said lower threshold line, and said position of said center line.

* * * * *